Figure 1:
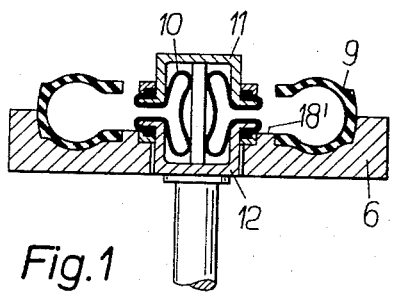

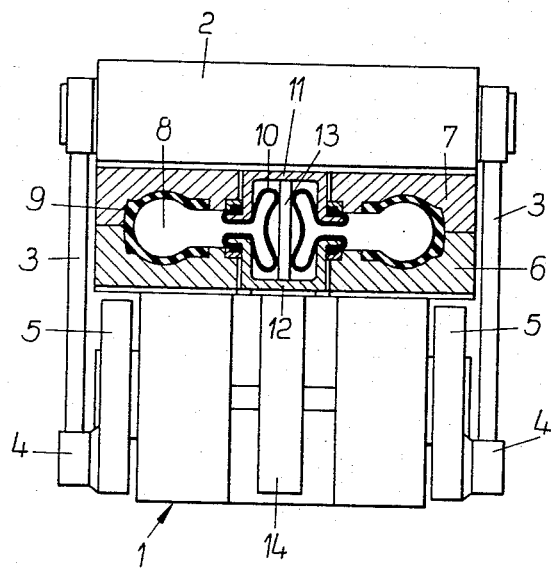

3,337,917
VULCANIZING PRESS FOR VULCANIZING
VEHICLE TIRES
Walter Balle, Dornigheim, near Hanau am Main, Staatsangeh, Germany, assignor to Leonh. Herbert Maschinenfabrik, Bergen-Enkheim, Germany
Filed Nov. 3, 1965, Ser. No. 506,201
Claims priority, application Germany, Nov. 6, 1964, H 54,231
2 Claims. (Cl. 18—17)

The present invention relates to vulcanizing presses for motor vehicle tires, that is to say, to presses equipped with a bladder fixed with its edges to two carrier supports movable towards each other and limiting the interior area of the bladder. The thick-walled bladder used with these presses serves at the same time for shaping the uncured tires, which are inserted in cylindrical shape in the press. The height of the bladder, that is the largest distance of its carrier supports from each other corresponds to the height of the uncured tire and to the inner circumference of the vulcanized tire. The uncured tire is tilted over the stretched and at that moment, evacuated bladder. Then the shaping pressure instead of vacuum is applied to the bladder. Shaping of the tire takes place simultaneously with the closing of the press under a simultaneous approach of the two bladder carrier supports.

If it is intended to vulcanize in presses of the kind described and on largely preformed tires, for instance belted tires or tires to be retreaded, the insertion of the bladder into the tire is difficult, since the height of the bladder exceeds several times the distance of the tire beads of the tire to be vulcanized. In order to avoid these difficulties, the bladder press described is, due to the invention, designed in such a way that the movable carrier supports of the bladder have a pot shape. They are turned to each other with their cavities and serve for accommodating the thin-walled bladder. On the strength of the invention, with such a press, the bladder is inserted in the tire to be vulcanized by means of superpressure, at a position of the bladder carrier supports to each other, whereby the distance of their pot edges corresponds to the distance of the beads of the ready tire from each other or approximately corresponds to this distance. Extracting the bladder from the vulcanized tire is effected in a way that the distance of the said carrier supports from each other is enlarged and simultaneously an underpressure is applied to the bladder. Then the carrier supports are returned to the position mentioned first.

With a press designed according to the invention, several advantages are achieved simultaneously. The pot-shape of the bladder carrier supports together with a thin-walled bladder, permits the positioning of the bladder in the said carrier supports, whereby the distance of these carrier supports is so small, that, by means of superpressure the bladder can be inserted into a tire, the tire beads of which having the same distance as in the case of a ready tire. By this arrangement, at the same time an essential diminution of the construction heights of the known presses is attained, since, until now, their opening width must be larger than the height of the uncured tire plus height of the stretched bladder. With a press according to the invention one need not consider more than the double height of the ready tire, which means, a fraction of the height required until now. As already indicated, a bladder can be inserted at a distance of the edges of the bladder carrier supports, which exactly or approximately corresponds to the distance of the tire beads. However, the bladder cannot be removed from the vulcanized tire only by means of a vacuum. But this will be possible, if simultaneously when applying vacuum the distance of the bladder carrier supports from each other will be increased. For this purpose, the distance has to be increased relatively little, so that also the driving elements of the bladder carrier supports respective of one of the carrier supports may be provided for with relatively short strokes. It will be advantageous to return the bladder carrier supports to their initial position immediately after extracting the bladder from the tire. This facilitates the removal of the tire from the mold and the bladder carrier supports return again to their initial position for the following operation of the press.

The bladder may have a thinner wall than the known bladders. This is admissible, since the bladder does not serve any more for shaping the uncured tire. With such a bladder, one may retain a small amount of the extension during the vulcanizing process, provided however, this bladder, due to this invention, is designed in such a way, that when unstretched, it has such a circumference in its central plane, which corresponds roughly to the inner circumference of the tire to be vulcanized.

Figure 2:
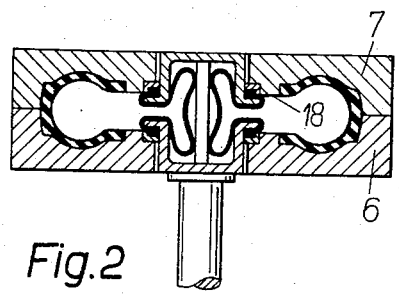
Figure 3:
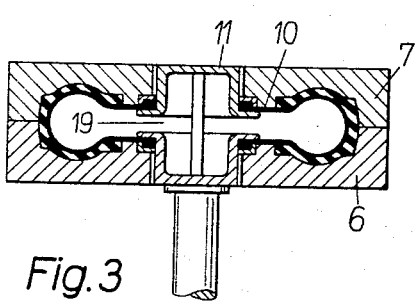
Figure 4:
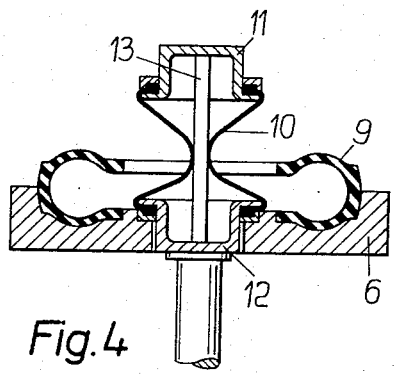
Figure 5:
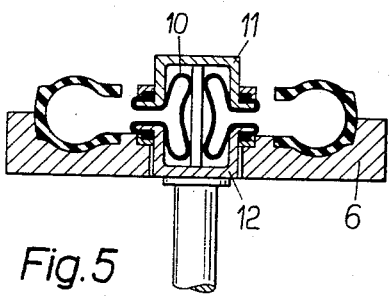
Figure 6:
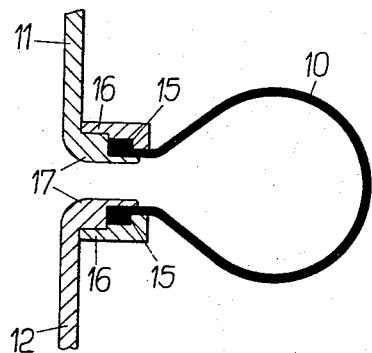

Further objects will be apparent from the following description when considered in connection with the accompanying drawings, in which:

FIGURE 1 is a cross section of certain parts of a vulcanizing press with respect to the present invention, FIGS. 2 to 5 are cross sections showing several operating positions of the press of FIG. 1, FIG. 6 is a cross section through a bladder designed according to the invention, and FIG. 7 shows a cross section corresponding to FIG. 2 and also shows schematic view of the complete press.

The press consists of a supporting frame 1 indicating the entire press, relative to which an upper part 2 is movable. The drive of the upper part 2 is effected by the draw-bars 3, which are hinged at trunnions 4. The trunnions 4 are attached to discs 5, the drive of which is not shown in the schematic view. Normally, it is operated by an electric motor with power gearing.

In the press the press mold is fixed. FIG. 7 shows a sectional view thereof. As already known, the press mold consists of a lower mold half 6 and an upper mold half 7. The lower mold half 6 is fixed to the press frame 1 and the upper mold half 7 at the movable upper part of the press 2. The mold has a cavity 8 to receive the tire 9 to be vulcanized. The present invention relates to a press, in which preferably preformed tires are to be vulcanized. Entirely preformed tires to be retreaded, means readily vulcanized tires which are only intended to be applied with a new rubber tread. Partly preformed are also belted tires. It is known that for vulcanization a bladder is deformed in such a way that it closely joins the inner wall of the tire. This deformation is achieved by inflating the bladder with hot water. Now, the present invention relates to the construction of this bladder and to the construction of the mechanism for extracting and inserting the bladder out of or into the tire.

FIG. 7 shows the bladder 10 in its idle position, which means in a position still before the curing method. In this position, the bladder 10 does not join closely the inside of the tire, but it is retracted inwards.

The vulcanizing press, according to this invention, has two pot-shaped carrier supports 11 and 12, to the edges of which the bladder 10 has been attached. The upper pot-shaped carrier support 11 has been attached to a rod 13 which, together with the upper carriage support 11 is movable upward and downward. The lower carrier support 12 is attached to a rod 14. Because of the relative movability between the rods 14 and 13, the pot-shaped carrier supports 11 and 12 can be approached to each other respectively removed from each other.

FIG. 6 shows a magnified view, how the edges 15 of the bladder 10 have to be inserted. FIG. 6 shows that the edges 15 are reinforced and, by means of clamping rings 16, they are pressed against flanges 17 provided for at the pot edges. For instance, the bladder 10 may be made of a tube with a bead-shaped reinforcement, which has been separated in the middle of the bead-shaped reinforcement, so that the shape shown in FIG. 6 results therefrom. The bladder 10 is of a relatively thin design. Its shape when unstretched approximately corresponds to the sectional view of FIG. 6, that is to say, the shape roughly corresponds to the inner shape of the tire.

FIGS. 1 to 5 describe a working method, which is in accordance with the present invention, and can be performed by means of the vulcanizing press. FIGS. 1 to 5 only represent parts of the press molds, but not the entire press.

FIG. 1 shows the initial state, that is the state of the press after insertion of the tire not yet vulcanized. The tire 9 shown in FIG. 1 is a tire to be retreaded. In the state according to FIG. 1, both pot-shaped carrier supports 11 and 12 have approached to each other so closely that their edges are at such a height that the outsides of the bladder 10 are at the point of insertion at equal height with the insides 18' and 18 of the lower part 6 of the press mold and also on an equal height with the upper part 7 yet to be mounted (see FIG. 2), which is not shown in FIG. 7. The bladder 10 is entirely accommodated within the pot-shaped carrier supports 11 and 12.

FIG. 2 shows the state of the mold with mounted upper mold half 7. As already mentioned, the point of insertion of the bladder 10 is at equal height with the inside 18 of the upper part of the press mold. The press being closed (FIG. 2), hot water is let into the interior of the bladder. This water pushes out the bladder 10 through crevice 19 between the upper and the lower carrier support 12. If further hot water is let in, the bladder 10 closely joins the inside of the tire. By the temperature effect of the hot water, the tire 9 is now vulcanized, which takes some time, for instance 15 minutes. At the end of the curing process first the pressure within the bladder 10 is released. Then the upper mold half 7 is removed, so that the tire is exposed. Thereafter, the upper carrier support 11 is raised to the position according to FIG. 4, whereby the bladder 10 is partially extracted from the tire 9. At the same time, a vacuum is generated in the bladder 10, with the effect that the bladder is moved towards the center, that is towards the rod 13. In this position, the upper pot-shaped carrier support 11 can be lowered again, whereby the bladder 10 is placed in the cavities of the carrier supports 11 and 12, so that finally the position shown in FIG. 5 is attained. This position corresponds to the position according to FIG. 1. Now the next tire can be inserted and the operation can commence once more.

The use of a thin bladder, due to this invention, and the lifting of the upper carrier support 11 simultaneously with the application of vacuum in the interior of the bladder, guarantees such a contraction of the bladder that this is finally accommodated in the cavities of the pot-shaped carrier supports 11 and 12. This is possible, although the bladder has a circular shape (see FIG. 6). If one does not extract the bladder partially from the tire, when vacuum is applied, it would be flatly compressed on account of the outside superpressure, but it would not be moved toward the center. In comparison with a press with cylindrical bladder, the height of the press is lower, since a relatively short upward motion of the pot 11 is sufficient to attain a safe extraction of the bladder 10 under influence of the vacuum. Also it is not necessary that the bladder, like the known bladders, has to be stretched, so that the tire can be tilted over, since, during the tilting operation, it rests within the pot-shaped carrier supports 11 and 12.

I claim:
1. A vulcanizing press for preformed motor vehicle tires or motor vehicle tires to be retreaded, comprising relatively movable carrier supports, a thin-walled bladder having upper and lower edges attached to the carrier supports to limit the interior of the bladder and movable towards each other, the movable carrier supports of the bladder being pot-shaped with cavities turned toward each other, and said carrier supports serving to accommodate the thin-walled bladder and means movable through one of the carrier supports and abutting the carrier supports to actuate the supports relative to each other.
2. A vulcanizing press according to claim 1, in which the bladder, when unstretched, has a circumference in its central plane, which approximately corresponds to the inner circumference of the tire.

References Cited

UNITED STATES PATENTS

| | | | |
|---|---|---|---|
| 2,296,800 | 9/1942 | Soderquist | 18—17 |
| 2,337,857 | 12/1943 | Soderquist | 18—17 |
| 2,763,317 | 9/1956 | Ostling et al. | 18—17 X |
| 2,854,693 | 10/1958 | Robbins | 18—17 X |

J. SPENCER OVERHOLSER, Primary Examiner.

J. HOWARD FLINT, JR., Examiner.